US012190140B2

(12) United States Patent
Jain et al.

(10) Patent No.: US 12,190,140 B2
(45) Date of Patent: Jan. 7, 2025

(54) SCHEDULING WORKLOADS IN A CONTAINER ORCHESTRATOR OF A VIRTUALIZED COMPUTER SYSTEM (71) Applicant: VMware, Inc., Palo Alto, CA (US)

(72) Inventors: Pranshu Jain, Sunnyvale, CA (US); Maarten Wiggers, San Francisco, CA (US); Rajesh Venkatasubramanian, San Jose, CA (US); Sahan Bamunavita Gamage, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 569 days.

(21) Appl. No.: 17/154,776

(22) Filed: Jan. 21, 2021

(65) Prior Publication Data
US 2022/0229686 A1 Jul. 21, 2022

(51) Int. Cl.
*G06F 9/455* (2018.01)
*G06F 9/48* (2006.01)

(52) U.S. Cl.
CPC ........ *G06F 9/45558* (2013.01); *G06F 9/4881* (2013.01); *G06F 2009/4557* (2013.01)

(58) Field of Classification Search
None
See application file for complete search history.

(56) References Cited

U.S. PATENT DOCUMENTS

| 7,203,944 B1 | 4/2007 | van Rietschote et al. |
| 7,707,578 B1 | 4/2010 | Zedlewski et al. |
| 8,037,280 B2 | 10/2011 | Pandey et al. |
| 8,667,500 B1 | 3/2014 | Ji et al. |
| 8,775,413 B2 | 7/2014 | Brown et al. |
| 8,850,432 B2 * | 9/2014 | McGrath ............... G06F 9/5077 718/1 |
| 8,869,165 B2 * | 10/2014 | Dasgupta ............... G06F 9/5038 718/106 |
| 9,116,929 B2 | 8/2015 | Morris et al. |
| 9,304,803 B2 | 4/2016 | Nelson et al. |

(Continued)

OTHER PUBLICATIONS

Jiang et al. "Developing Co-scheduling Mechanisms for Virtual Machines in Clouds", 2017 IEEE, pp. 257-263.*

(Continued)

*Primary Examiner* — Van H Nguyen
(74) *Attorney, Agent, or Firm* — Kim & Stewart LLP (57) ABSTRACT

An example method of scheduling a workload in a virtualized computing system including a host cluster having a virtualization layer directly executing on hardware platforms of hosts is described. The virtualization layer supports execution of virtual machines (VMs) and is integrated with an orchestration control plane. The method includes: receiving, at the orchestration control plane, a workload specification for the workload; selecting, at the orchestration control plane, a plurality of nodes for the workload based on the workload specification, each of the plurality of nodes implemented by a host of the hosts; selecting, by the orchestration control plane in cooperation with a virtualization management server managing the host cluster, a node of the plurality of nodes; and deploying, by the orchestration control plane in cooperation with the virtualization management server, the workload on a host in the host cluster implementing the selected node.

17 Claims, 6 Drawing Sheets

(56) References Cited

U.S. PATENT DOCUMENTS

| | | | |
|---|---|---|---|
| 9,507,631 | B2 | 11/2016 | Chen et al. |
| 10,037,225 | B2* | 7/2018 | Jeong ................. G06F 9/5061 |
| 10,133,619 | B1* | 11/2018 | Nagpal ................ G06F 11/079 |
| 10,241,840 | B2 | 3/2019 | Tsai et al. |
| 10,374,887 | B2* | 8/2019 | Kerpez ................. H04L 41/14 |
| 10,379,908 | B2* | 8/2019 | Vyas ................. G06F 11/3055 |
| 10,505,815 | B2* | 12/2019 | Padala ............... H04L 41/0806 |
| 10,545,796 | B2* | 1/2020 | Bahramshahry ........ G06F 9/505 |
| 10,871,998 | B2* | 12/2020 | Parees ................ G06F 9/505 |
| 10,977,086 | B2* | 4/2021 | Jha ................... G06F 9/5077 |
| 11,182,196 | B2* | 11/2021 | Gamage ............... G06F 9/5027 |
| 11,245,538 | B2* | 2/2022 | Doshi ................ G06F 9/44594 |
| 11,294,726 | B2* | 4/2022 | Bahramshahry ...... G06F 9/5044 |
| 11,372,688 | B2 | 6/2022 | Wang et al. |
| 2008/0028411 | A1 | 1/2008 | Cherkasova et al. |
| 2010/0325637 | A1 | 12/2010 | Radmilac et al. |
| 2015/0143381 | A1 | 5/2015 | Chin et al. |
| 2015/0154056 | A1 | 6/2015 | Chen et al. |
| 2019/0220319 | A1* | 7/2019 | Parees ................ G06F 9/5027 |
| 2019/0223023 | A1* | 7/2019 | Altay ................. H04L 41/5051 |
| 2020/0192724 | A1 | 6/2020 | Wang et al. |
| 2021/0311764 | A1* | 10/2021 | Rosoff ................ G06F 9/5077 |

OTHER PUBLICATIONS

Non-Final Office Action mailed Oct. 27, 2022 in U.S. Appl. No. 16/943,710, 24 pages.

Grandl et al. "Multi-Resource Packing for Cluster Schedulers," ACM SIGCOMM Computer Communication Review, vol. 44, No. 4, 2014, pp. 455-466.

Tian et al. "A Dynamic MapReduce Scheduler for Heterogeneous Workloads," 2009 Eighth International Conference on Grid and Cooperative Computing, IEEE, 2009, pp. 218-224.

International Search Report and Written Opinion mailed Nov. 4, 2021 in corresponding International Application No. PCT/US2021/043248, 8 pages.

U.S. Appl. No. 16/838,690, filed Apr. 2, 2020, 44 pages.
U.S. Appl. No. 16/681,990, filed Nov. 13, 2019, 40 pages.

* cited by examiner

SCHEDULING WORKLOADS IN A CONTAINER ORCHESTRATOR OF A VIRTUALIZED COMPUTER SYSTEM

Applications today are deployed onto a combination of virtual machines (VMs), containers, application services, and more. For deploying such applications, a container orchestration platform known as Kubernetes® has gained in popularity among application developers. Kubernetes provides a platform for automating deployment, scaling, and operations of application containers across clusters of hosts. It offers flexibility in application development and offers several useful tools for scaling.

In a Kubernetes system, containers are grouped into a logical unit called a "pod." Containers in the same pod share the same resources and network and maintain a degree of isolation from containers in other pods. The pods are distributed across nodes of the Kubernetes system and an image cache is provided on each node to speed up pod deployment. A node includes an operating system (OS), such as Linux®, and a container engine executing on top of the OS that supports the containers of the pod. Kubernetes control plane components (e.g., a kubelet) execute on the OS alongside the containers. Thus, a node includes multiple containers and control plane components executing on a shared OS.

Kubernetes nodes can be implemented in a virtualized computing system including a cluster of hosts having a virtualization layer executing on host hardware platforms to support execution of virtual machines (VMs). In this system, each host in the cluster operates as a Kubernetes node and Kubernetes pods are implemented as VMs (hereinafter referred to as "pod VMs"), each of which includes an OS and a container engine that supports execution of containers therein. Such a Kubernetes system further includes other VMs that implement the Kubernetes control plane components and support applications implemented using the pod VMs.

The integration of the Kubernetes control plane into the virtualization computing system results in scheduling complexities because the Kubernetes control plane employs a scheduler for placing pods on nodes (which, in the integrated system, means pod VMs being scheduled on hosts of the cluster), and the virtualization computing system employs a scheduler for placing VMs, including pod VMs, on the same hosts of the cluster. These schedulers, each running its own scheduling algorithm, may conflict with each other.

SUMMARY

In an embodiment, a method of scheduling a workload in a virtualized computing system including a host cluster having a virtualization layer directly executing on hardware platforms of hosts is described. The virtualization layer supports execution of virtual machines (VMs) and is integrated with an orchestration control plane. The method includes: receiving, at the orchestration control plane, a workload specification for the workload; selecting, at the orchestration control plane, a plurality of nodes for the workload based on the workload specification, each of the plurality of nodes implemented by a host of the hosts; selecting, by the orchestration control plane in cooperation with a virtualization management server managing the host cluster, a node of the plurality of nodes; and deploying, by the orchestration control plane in cooperation with the virtualization management server, the workload on a host in the host cluster implementing the selected node.

Further embodiments include a non-transitory computer-readable storage medium comprising instructions that cause a computer system to carry out the above methods, as well as a computer system configured to carry out the above methods.

DETAILED DESCRIPTION

Data protection for control planes in a virtualized computing system is described. In embodiments described herein, a virtualized computing system includes a software-defined datacenter (SDDC) comprising a server virtualization platform integrated with a logical network platform. The server virtualization platform includes clusters of physical servers ("hosts") referred to as "host clusters." Each host cluster includes a virtualization layer, executing on host hardware platforms of the hosts, which supports execution of virtual machines (VMs). A virtualization management server manages host clusters, the virtualization layers, and the VMs executing thereon.

In embodiments, the virtualization layer of a host cluster is integrated with an orchestration control plane, such as a Kubernetes® control plane. This integration enables the host cluster as a "supervisor cluster" that uses VMs to implement both control plane nodes having a Kubernetes control plane, and compute nodes managed by the control plane nodes. For example, Kubernetes pods are implemented as "pod VMs," each of which includes a kernel and container engine that supports execution of containers. In embodiments, the Kubernetes control plane of the supervisor cluster is extended to support custom objects in addition to pods, such as VM objects that are implemented using native VMs (as opposed to pod VMs). A virtualization infrastructure administrator (VI admin) can enable a host cluster as a supervisor cluster and provide its functionality to development teams.

In embodiments, the orchestration control plane includes a scheduler for scheduling workloads (e.g., pods) on nodes. The orchestration control plane scheduler is a "slave scheduler" in that it does not select a node itself, but rather selects a candidate set of nodes. A scheduler in the VI control plane (e.g., a virtualization management server that manages the host cluster) functions as a "master scheduler." The orchestration control plane communicates the candidate set of nodes to the master scheduler, which selects a node therefrom. The master scheduler ensures that the host corresponding to the selected node can accommodate the workload based on its requirements. These and further advantages and aspects of the disclosed techniques are described below with respect to the drawings.

Figure 1:
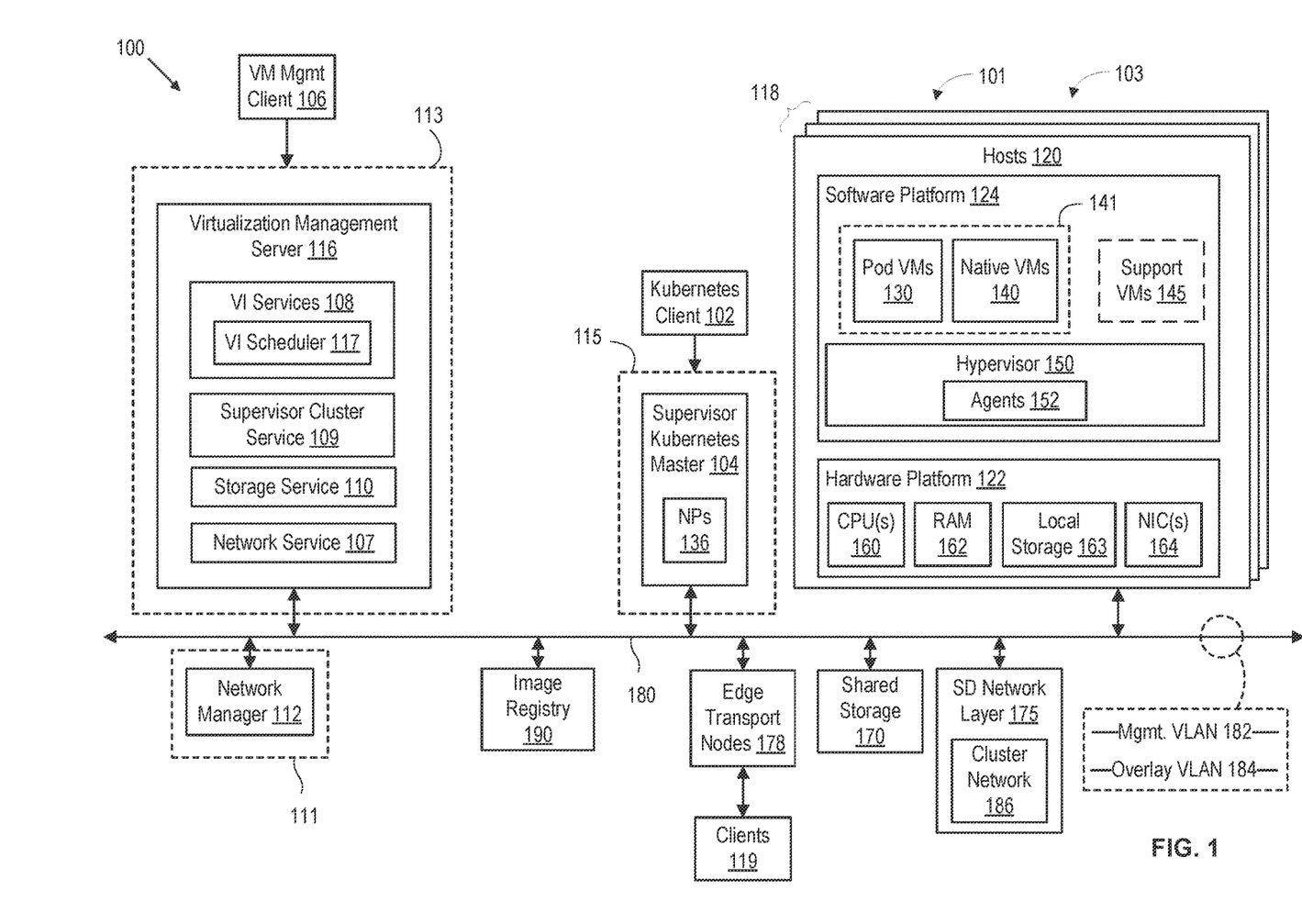
FIG. 1 is a block diagram of a clustered computer system in which embodiments may be implemented.

FIG. 1 is a block diagram of a virtualized computing system 100 in which embodiments described herein may be implemented. System 100 includes a cluster of hosts 120 ("host cluster 118") that may be constructed on server-grade hardware platforms such as an x86 architecture platforms. For purposes of clarity, only one host cluster 118 is shown. However, virtualized computing system 100 can include many of such host clusters 118. As shown, a hardware platform 122 of each host 120 includes conventional components of a computing device, such as one or more central processing units (CPUs) 160, system memory (e.g., random access memory (RAM) 162), one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a physical network 180. Physical network 180 enables communication between hosts 120 and between other components and hosts 120 (other components discussed further herein). Physical network 180 can include a plurality of VLANs to provide external network virtualization as described further herein.

In the embodiment illustrated in FIG. 1, hosts 120 access shared storage 170 by using NICs 164 to connect to network 180. In another embodiment, each host 120 contains a host bus adapter (HBA) through which input/output operations (IOs) are sent to shared storage 170 over a separate network (e.g., a fibre channel (FC) network). Shared storage 170 include one or more storage arrays, such as a storage area network (SAN), network attached storage (NAS), or the like. Shared storage 170 may comprise magnetic disks, solid-state disks, flash memory, and the like as well as combinations thereof. In some embodiments, hosts 120 include local storage 163 (e.g., hard disk drives, solid-state drives, etc). Local storage 163 in each host 120 can be aggregated and provisioned as part of a virtual SAN, which is another form of shared storage 170.

A software platform 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) may be concurrently instantiated and executed. One example of hypervisor 150 that may be configured and used in embodiments described herein is a VMware ESXi™ hypervisor provided as part of the VMware vSphere® solution made commercially available by VMware, Inc. of Palo Alto, CA.

In the example of FIG. 1, host cluster 118 is enabled as a "supervisor cluster," described further herein, and thus VMs executing on each host 120 include pod VMs 130 and native VMs 140. A pod VM 130 is a virtual machine that includes a kernel and container engine that supports execution of containers, as well as an agent (referred to as a pod VM agent) that cooperates with a controller of an orchestration control plane 115 executing in hypervisor 150 (referred to as a pod VM controller). An example of pod VM 130 is described further below with respect to FIG. 2. VMs 130/140 support applications 141 deployed onto host cluster 118, which can include containerized applications (e.g., executing in either pod VMs 130 or native VMs 140) and applications executing directly on guest operating systems (non-containerized) (e.g., executing in native VMs 140). One specific application discussed further herein is a guest cluster executing as a virtual extension of a supervisor cluster. Some VMs 130/140, shown as support VMs 145, have specific functions within host cluster 118. For example, support VMs 145 can provide control plane functions, edge transport functions, and the like. An embodiment of software platform 124 is discussed further below with respect to FIG. 2.

Host cluster 118 is configured with a software-defined (SD) network layer 175. SD network layer 175 includes logical network services executing on virtualized infrastructure in host cluster 118. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches, logical routers, logical firewalls, logical virtual private networks (VPNs), logical load balancers, and the like, implemented on top of the virtualized infrastructure. In embodiments, virtualized computing system 100 includes edge transport nodes 178 that provide an interface of host cluster 118 to an external network (e.g., a corporate network, the public Internet, etc.). Edge transport nodes 178 can include a gateway between the internal logical networking of host cluster 118 and the external network. Edge transport nodes 178 can be physical servers or VMs. For example, edge transport nodes 178 can be implemented in support VMs 145 and include a gateway of SD network layer 175. Various clients 119 can access service(s) in virtualized computing system through edge transport nodes 178 (including VM management client 106 and Kubernetes client 102, which as logically shown as being separate by way of example).

Virtualization management server 116 is a physical or virtual server that manages host cluster 118 and the virtualization layer therein. Virtualization management server 116 installs agent(s) 152 in hypervisor 150 to add a host 120 as a managed entity. Virtualization management server 116 logically groups hosts 120 into host cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in host cluster 118 may be one or many. Virtualization management server 116 can manage more than one host cluster 118.

In an embodiment, virtualization management server 116 further enables host cluster 118 as a supervisor cluster 101. Virtualization management server 116 installs additional agents 152 in hypervisor 150 to add host 120 to supervisor cluster 101. Supervisor cluster 101 integrates an orchestration control plane 115 with host cluster 118. In embodiments, orchestration control plane 115 includes software components that support a container orchestrator, such as Kubernetes, to deploy and manage applications on host cluster 118. By way of example, a Kubernetes container orchestrator is described herein. In supervisor cluster 101, hosts 120 become nodes of a Kubernetes cluster and pod VMs 130 executing on hosts 120 implement Kubernetes pods. Orchestration control plane 115 includes supervisor Kubernetes master 104 and agents 152 executing in virtualization layer (e.g., hypervisors 150). Supervisor Kubernetes master 104 includes control plane components of Kubernetes, as well as custom controllers, custom plugins, scheduler extender, and the like that extend Kubernetes to interface with virtualization management server 116 and the virtualization layer. In embodiments, supervisor Kubernetes master 104 includes a network plugin (NP) 136 that cooperates with network manager 112 to control and configure SD network layer 175. For purposes of clarity, supervisor Kubernetes master 104 is shown as a separate logical entity. For practical implementations, supervisor Kubernetes master 104 is implemented as one or more VM(s) 130/140 in host cluster 118. Further, although only one supervisor Kubernetes master 104 is shown, supervisor cluster 101 can include more than one supervisor Kubernetes master 104 in a logical cluster for redundancy and load balancing. Virtualized computing system 100 can include one or more supervisor Kubernetes masters 104 (also referred to as "master server(s)").

In an embodiment, virtualized computing system 100 further includes a storage service 110 that implements a storage provider in virtualized computing system 100 for container orchestrators. In embodiments, storage service 110 manages lifecycles of storage volumes (e.g., virtual disks) that back persistent volumes used by containerized applications executing in host cluster 118. A container orchestrator such as Kubernetes cooperates with storage service 110 to provide persistent storage for the deployed applications. In the embodiment of FIG. 1, supervisor Kubernetes master 104 cooperates with storage service 110 to deploy and manage persistent storage in the supervisor cluster environment. Storage service 110 can execute in virtualization management server 116 as shown or operate independently from virtualization management server 116 (e.g., as an independent physical or virtual server).

In an embodiment, virtualized computing system 100 further includes a network manager 112. Network manager 112 is a physical or virtual server that orchestrates SD network layer 175. In an embodiment, network manager 112 comprises one or more virtual servers deployed as VMs. Network manager 112 installs additional agents 152 in hypervisor 150 to add a host 120 as a managed entity, referred to as a transport node. In this manner, host cluster 118 can be a cluster 103 of transport nodes. One example of an SD networking platform that can be configured and used in embodiments described herein as network manager 112 and SD network layer 175 is a VMware NSX® platform made commercially available by VMware, Inc. of Palo Alto, CA.

Network manager 112 can deploy one or more transport zones in virtualized computing system 100, including VLAN transport zone(s) and an overlay transport zone. A VLAN transport zone spans a set of hosts 120 (e.g., host cluster 118) and is backed by external network virtualization of physical network 180 (e.g., a VLAN). One example VLAN transport zone uses a management VLAN 182 on physical network 180 that enables a management network connecting hosts 120 and the VI control plane (e.g., virtualization management server 116 and network manager 112). An overlay transport zone using overlay VLAN 184 on physical network 180 enables an overlay network that spans a set of hosts 120 (e.g., host cluster 118) and provides internal network virtualization using software components (e.g., the virtualization layer and services executing in VMs). Host-to-host traffic for the overlay transport zone is carried by physical network 180 on the overlay VLAN 184 using layer-2-over-layer-3 tunnels. Network manager 112 can configure SD network layer 175 to provide a cluster network 186 using the overlay network. The overlay transport zone can be extended into at least one of edge transport nodes 178 to provide ingress/egress between cluster network 186 and an external network.

In an embodiment, system 100 further includes an image registry 190. As described herein, containers of supervisor cluster 101 execute in pod VMs 130. The containers in pod VMs 130 are spun up from container images managed by image registry 190. Image registry 190 manages images and image repositories for use in supplying images for containerized applications.

Virtualization management server 116 implements a virtual infrastructure (VI) control plane 113 of virtualized computing system 100. VI control plane 113 controls aspects of the virtualization layer for host cluster 118 (e.g., hypervisor 150). Network manager 112 implements a network control plane 111 of virtualized computing system 100. Network control plane 111 controls aspects SD network layer 175.

Virtualization management server 116 can include a supervisor cluster service 109, storage service 110, network service 107, protection service(s) 105, and VI services 108. VI services 108 can include a VI scheduler 117. Supervisor cluster service 109 enables host cluster 118 as supervisor cluster 101 and deploys the components of orchestration control plane 115. VI services 108 include various virtualization management services, such as high-availability (HA) service, single sign-on (SSO) service, virtualization management daemon, and the like. VI scheduler 117 is configured to aggregate the resources of host cluster 118 to provide resource pools and enforce resource allocation policies. VI scheduler 117 also provides resource management in the form of load balancing, power management, VM placement, and the like. HA service is configured to pool VMs and hosts into a monitored cluster and, in the event of a failure, restart VMs on alternate hosts in the cluster. A single host is elected as a master, which communicates with the HA service and monitors the state of protected VMs on subordinate hosts. The HA service uses admission control to ensure enough resources are reserved in the cluster for VM recovery when a host fails. SSO service comprises security token service, administration server, directory service, identity management service, and the like configured to implement an SSO platform for authenticating users. The virtualization management daemon is configured to manage objects, such as data centers, clusters hosts, VMs, resource pools, datastores, and the like. Network service 107 is configured to interface an API of network manager 112. Virtualization management server 108 communicates with network manager 112 through network service 107.

A VI admin can interact with virtualization management server 116 through a VM management client 106. Through VM management client 106, a VI admin commands virtualization management server 116 to form host cluster 118, configure resource pools, resource allocation policies, and other cluster-level functions, configure storage and networking, enable supervisor cluster 101, deploy and manage image registry 190, and the like.

Kubernetes client 102 represents an input interface for a user to supervisor Kubernetes master 104. Kubernetes client 102 is commonly referred to as kubectl. Through Kubernetes client 102, a user submits desired states of the Kubernetes system, e.g., as YAML documents, to supervisor Kubernetes master 104. In embodiments, the user submits the desired states within the scope of a supervisor namespace. A "supervisor namespace" is a shared abstraction between VI control plane 113 and orchestration control plane 115. Each supervisor namespace provides resource-constrained and authorization-constrained units of multi-tenancy. A supervisor namespace provides resource constraints, user-access constraints, and policies (e.g., storage policies, network policies, etc.). Resource constraints can be expressed as quotas, limits, and the like with respect to compute (CPU and memory), storage, and networking of the virtualized infrastructure (host cluster 118, shared storage 170, SD network layer 175). User-access constraints include definitions of users, roles, permissions, bindings of roles to users, and the like. Each supervisor namespace is expressed within orchestration control plane 115 using a namespace native to orchestration control plane 115 (e.g., a Kubernetes namespace or generally a "native namespace"), which allows users to deploy applications in supervisor cluster 101 within the scope of supervisor namespaces. In this manner, the user interacts with supervisor Kubernetes master 104 to deploy applications in supervisor cluster 101 within defined supervisor namespaces.

While FIG. 1 shows an example of a supervisor cluster 101, the techniques described herein do not require a supervisor cluster 101. In some embodiments, host cluster 118 is not enabled as a supervisor cluster 101. In such case, supervisor Kubernetes master 104, Kubernetes client 102, pod VMs 130, supervisor duster service 109, and image registry 190 can be omitted. While host cluster 118 is show as being enabled as a transport node cluster 103, in other embodiments network manager 112 can be omitted. In such case, virtualization management server 116 functions to configure SD network layer 175.

Figure 2:
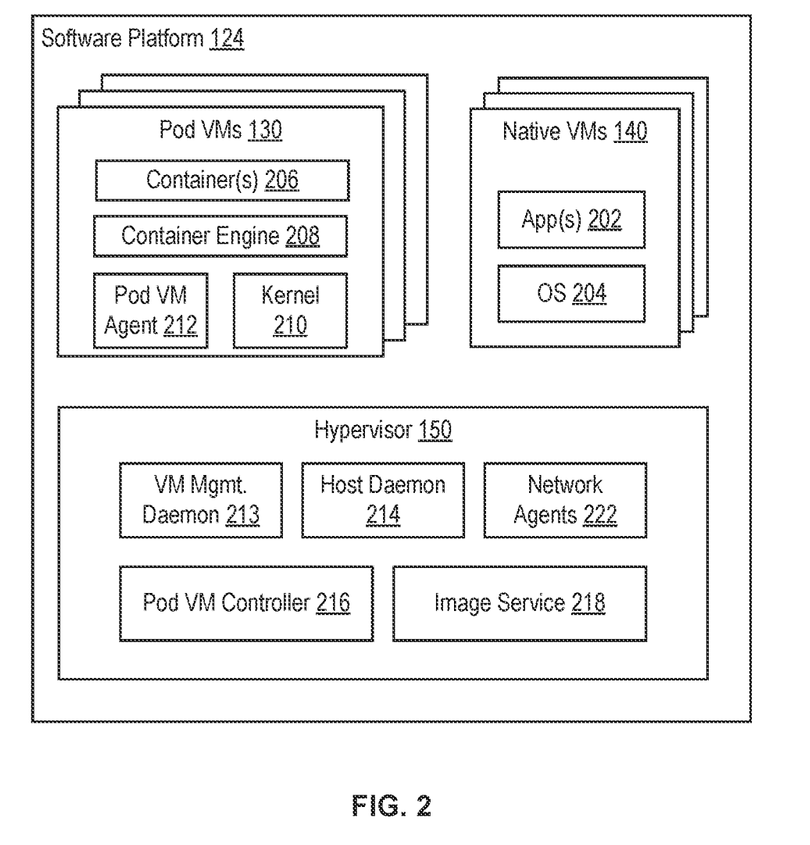
FIG. 2 is a block diagram depicting a software platform and shared storage according an embodiment.

FIG. 2 is a block diagram depicting software platform 124 according an embodiment. As described above, software platform 124 of host 120 includes hypervisor 150 that supports execution of VMs, such as pod VMs 130, native VMs 140, and support VMs 145. In an embodiment, hypervisor 150 includes a VM management daemon 213, a host daemon 214, a pod VM controller 216, an image service 218, and network agents 222. VM management daemon 213 is an agent 152 installed by virtualization management server 116. VM management daemon 213 provides an interface to host daemon 214 for virtualization management server 116. Host daemon 214 is configured to create, configure, and remove VMs (e.g., pod VMs 130 and native VMs 140).

Pod VM controller 216 is an agent 152 of orchestration control plane 115 for supervisor cluster 101 and allows supervisor Kubernetes master 104 to interact with hypervisor 150. Pod VM controller 216 configures the respective host as a node in supervisor cluster 101. Pod VM controller 216 manages the lifecycle of pod VMs 130, such as determining when to spin-up or delete a pod VM. Pod VM controller 216 also ensures that any pod dependencies, such as container images, networks, and volumes are available and correctly configured. Pod VM controller 216 is omitted if host cluster 118 is not enabled as a supervisor cluster 101.

Image service 218 is configured to pull container images from image registry 190 and store them in shared storage 170 such that the container images can be mounted by pod VMs 130. Image service 218 is also responsible for managing the storage available for container images within shared storage 170. This includes managing authentication with image registry 190, assuring providence of container images by verifying signatures, updating container images when necessary, and garbage collecting unused container images. Image service 218 communicates with pod VM controller 216 during spin-up and configuration of pod VMs 130. In some embodiments, image service 218 is part of pod VM controller 216. In embodiments, image service 218 utilizes system VMs 130/140 in support VMs 145 to fetch images, convert images to container image virtual disks, and cache container image virtual disks in shared storage 170.

Network agents 222 comprises agents 152 installed by network manager 112. Network agents 222 are configured to cooperate with network manager 112 to implement logical network services. Network agents 222 configure the respective host as a transport node in a cluster 103 of transport nodes.

Each pod VM 130 has one or more containers 206 running therein in an execution space managed by container engine 208. The lifecycle of containers 206 is managed by pod VM agent 212. Both container engine 208 and pod VM agent 212 execute on top of a kernel 210 (e.g., a Linux® kernel). Each native VM 140 has applications 202 running therein on top of an OS 204. Native VMs 140 do not include pod VM agents and are isolated from pod VM controller 216. Container engine 208 can be an industry-standard container engine, such as libcontainer, runc, or containerd. Pod VMs 130, pod VM controller 216, and image service 218 are omitted if host cluster 118 is not enabled as a supervisor cluster 101.

Figure 3:
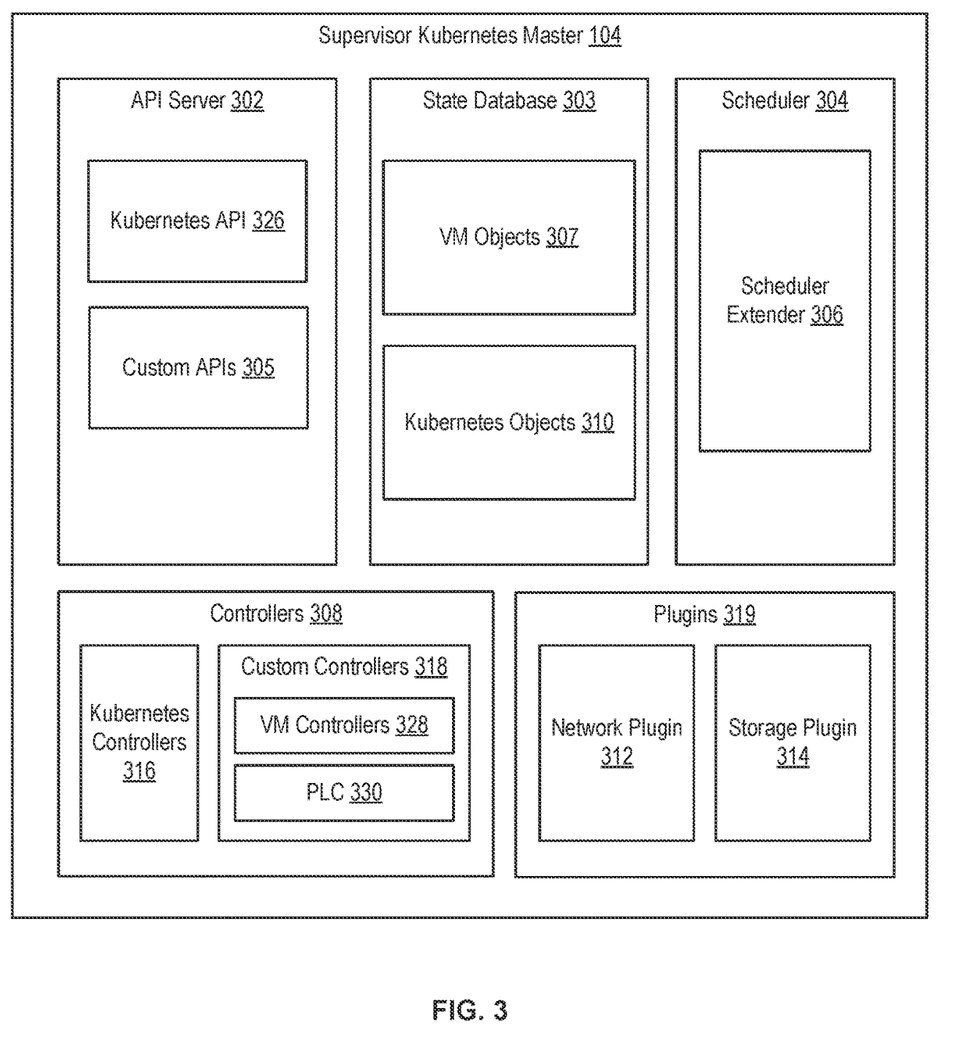
FIG. 3 is a block diagram of supervisor Kubernetes master according to an embodiment.

FIG. 3 is a block diagram of supervisor Kubernetes master 104 according to an embodiment. Supervisor Kubernetes master 104 includes application programming interface (API) server 302, a state database 303, a scheduler 304, a scheduler extender 306, controllers 308, and plugins 319. API server 302 includes the Kubernetes API server, kube-api-server ("Kubernetes API 326") and custom APIs 305. Custom APIs 305 are API extensions of Kubernetes API 326 using either the custom resource/operator extension pattern or the API extension server pattern. Custom APIs 305 are used to create and manage custom resources, such as VM objects. API server 302 provides a declarative schema for creating, updating, deleting, and viewing objects.

State database 303 stores the state of supervisor cluster 101 (e.g., etcd) as objects created by API server 302. A user can provide application specification data to API server 302 that defines various objects supported by the API (e.g., as a YAML document). The objects have specifications that represent the desired state. State database 303 stores the objects defined by application specification data as part of the supervisor cluster state. Standard Kubernetes objects ("Kubernetes objects 310") include namespaces, nodes, pods, config maps, secrets, among others. Custom objects are resources defined through custom APIs 305 (e.g., VM objects 307).

Namespaces provide scope for objects. Namespaces are objects themselves maintained in state database 303. A namespace can include resource quotas, limit ranges, role bindings, and the like that are applied to objects declared within its scope. VI control plane 113 creates and manages supervisor namespaces for supervisor cluster 101. A supervisor namespace is a resource-constrained and authorization-constrained unit of multi-tenancy managed by virtualization management server 116. Namespaces inherit constraints from corresponding supervisor cluster namespaces. Contig maps include configuration information for applications managed by supervisor Kubernetes master 104. Secrets include sensitive information for use by applications managed by supervisor Kubernetes master 104 (e.g., passwords, keys, tokens, etc.). The configuration information and the secret information stored by config maps and secrets is generally referred to herein as decoupled information. Decoupled information is information needed by the managed applications, but which is decoupled from the application code.

Controllers 308 can include, for example, standard Kubernetes controllers ("Kubernetes controllers 316") (e.g., kube-controller-manager controllers, cloud-controller-manager controllers, etc.) and custom controllers 318. Custom controllers 318 include controllers for managing lifecycle of Kubernetes objects 310 and custom objects. For example, custom controllers 318 can include a VM controllers 328 configured to manage VM objects 307 and a pod VM lifecycle controller (PLC) 330 configured to manage pods 324. A controller 308 tracks objects in state database 303 of at least one resource type. Controller(s) 318 are responsible for making the current state of supervisor cluster 101 come closer to the desired state as stored in state database 303. A controller 318 can carry out action(s) by itself, send messages to API server 302 to have side effects, and/or interact with external systems.

Plugins 319 can include, for example, network plugin 312 and storage plugin 314. Plugins 319 provide a well-defined interface to replace a set of functionality of the Kubernetes control plane. Network plugin 312 is responsible for configuration of SD network layer 175 to deploy and configure the cluster network. Network plugin 312 cooperates with virtualization management server 116 and/or network manager 112 to deploy logical network services of the cluster network. Network plugin 312 also monitors state database for custom objects 307, such as NIF objects. Storage plugin 314 is responsible for providing a standardized interface for persistent storage lifecycle and management to satisfy the needs of resources requiring persistent storage. Storage plugin 314 cooperates with virtualization management server 116 and/or persistent storage manager 110 to implement the appropriate persistent storage volumes in shared storage 170.

Scheduler 304 watches state database 303 for newly created pods with no assigned node. A pod is an object supported by API server 302 that is a group of one or more containers, with network and storage, and a specification on how to execute. Scheduler 304 selects candidate nodes in supervisor cluster 101 for pods. Scheduler 304 cooperates with scheduler extender 306, which interfaces with virtualization management server 116. Scheduler extender 306 cooperates with virtualization management server 116 (e.g., such as with DRS) to select nodes from candidate sets of nodes and provide identities of hosts 120 corresponding to the selected nodes. For each pod, scheduler 304 also converts the pod specification to a pod VM specification, and scheduler extender 306 asks virtualization management server 116 to reserve a pod VM on the selected host 120. Scheduler 304 updates pods in state database 303 with host identifiers.

Kubernetes API 326, state database 303, scheduler 304, and Kubernetes controllers 316 comprise standard components of a Kubernetes system executing on supervisor cluster 101. Custom controllers 318, plugins 319, and scheduler extender 306 comprise custom components of orchestration control plane 115 that integrate the Kubernetes system with host cluster 118 and VI control plane 113.

In embodiments, custom APIs 305 enable developers to discover available content and to import existing VMs as new images within their Kubernetes Namespace. In embodiments, VM objects 307 that can be specified through custom APIs 305 include VM resources, VM image resources, VM profile resources, network policy resources, network resources, and service resources.

Figure 4:
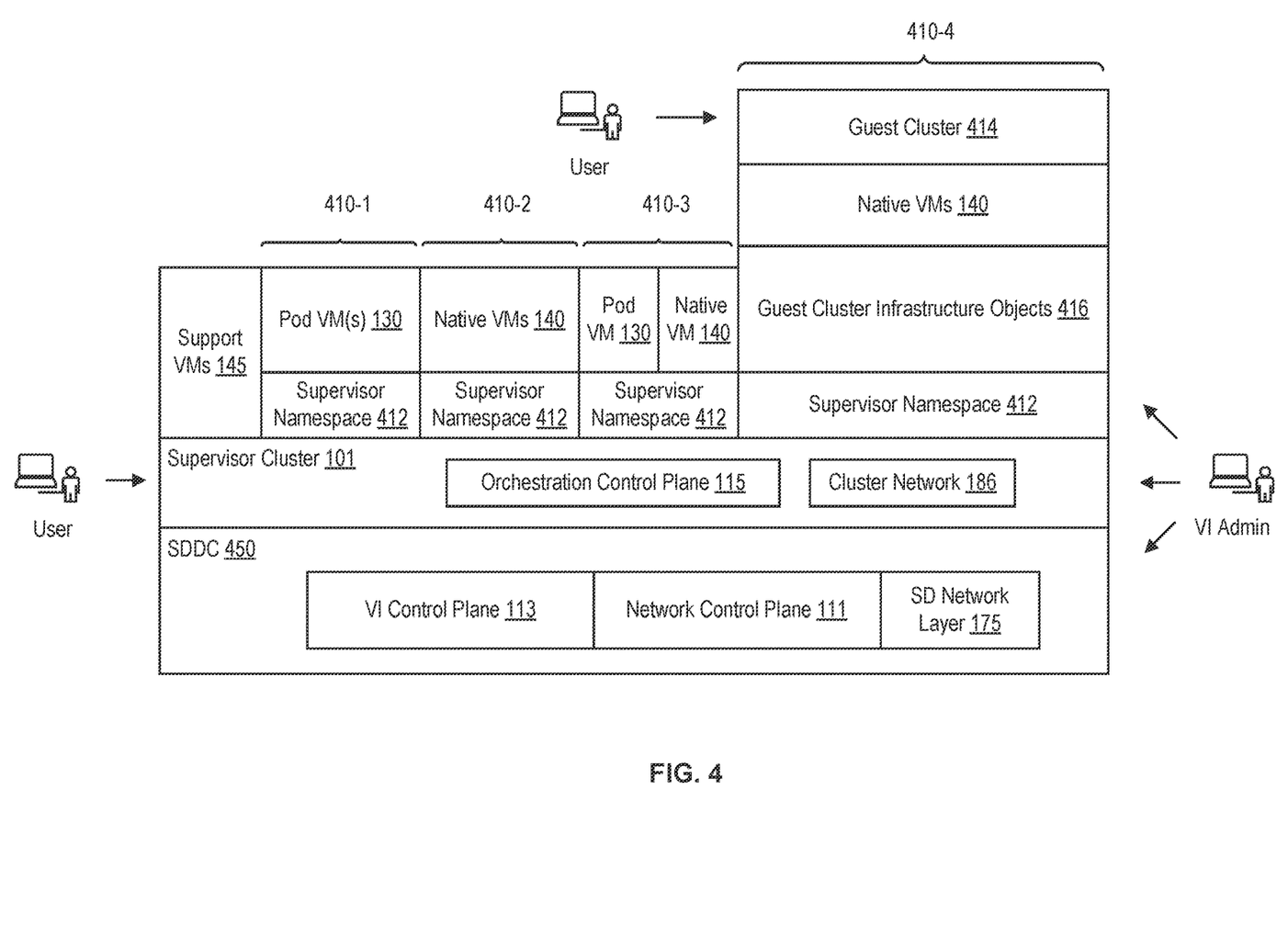
FIG. 4 is a block diagram depicting a logical view of a virtualized computing system having applications executing therein according to an embodiment.

FIG. 4 is a block diagram depicting a logical view of virtualized computing system 100 having applications executing therein according to an embodiment. In the embodiment, supervisor cluster 101 is implemented by an SDDC 450. SDDC 450 includes VI control plane 113 and network control plane 111. VI control plane 113 comprises virtualization management server 116 and associated components in the virtualization layer (e.g., control plane/data plane agents) that controls host clusters 118 and virtualization layers (e.g., hypervisors 150). Network control plane 111 comprises network manager 112 and associated components in the virtualization layer (e.g., control plane agents and data plane agents). VI control plane 113 cooperates with network control plane 111 to orchestrate SD network layer 175. VI control plane 113 (e.g., virtualization management server 116) provides a single entity for orchestration of compute, storage, and network.

In some embodiments, a VI admin interacts with virtualization management server 116 to configure SDDC 450 to implement supervisor cluster 101 and cluster network 186 in supervisor cluster 101. Cluster network 186 includes deployed virtualized infrastructure distributed switch, port groups, resource pools, support VMs 145) and logical network services implemented thereon (e.g., logical switching, logical routing, etc.).

Supervisor cluster 101 includes orchestration control plane 115, which includes supervisor Kubernetes master(s) 104 and pod VM controllers 216. The VI admin interacts with Virtualization management server 116 to create supervisor namespaces 412. Each supervisor namespace 412 includes a resource pool and authorization constraints. The resource pool includes various resource constraints on supervisor namespace 412 (e.g., reservation, limits, and share (RLS) constraints). Authorization constraints provide for which roles are permitted to perform which operations in supervisor namespace 412 (e.g., allowing VI admin to create, manage access, allocate resources, view, and create objects; allowing DevOps to view and create objects; etc.). A user interacts with supervisor Kubernetes master 104 to deploy applications 410 on supervisor cluster 101 within scopes of supervisor namespaces 412. In the example, the user deploys an application 410-1 on pod VM(s) 130, an application 410-2 on native VMs 140, and application 410-3 on both a pod VM 130 and a native VM 140.

In embodiments, the user also deploys a guest cluster 414 on supervisor cluster 101 within a supervisor namespace 412 to implement a Kubernetes cluster. Guest cluster 414 is constrained by the authorization and resource policy applied by the supervisor namespace in which it is deployed. Orchestration control plane 115 includes guest cluster infrastructure software (GCIS) configured to realize guest cluster 414 as a virtual extension of supervisor cluster 101. The GCIS creates and manages guest cluster infrastructure objects 416 to provide abstract and physical representations of infrastructure supporting guest cluster 414. The GCIS executes in orchestration control plane 115 (e.g., in supervisor Kubernetes master 104). A user can interact with the Kubernetes control plane in guest cluster 414 to deploy various containerized applications (an application 310-4). Applications 410 can communicate with each other or with an external network through cluster network 186.

Figure 5:
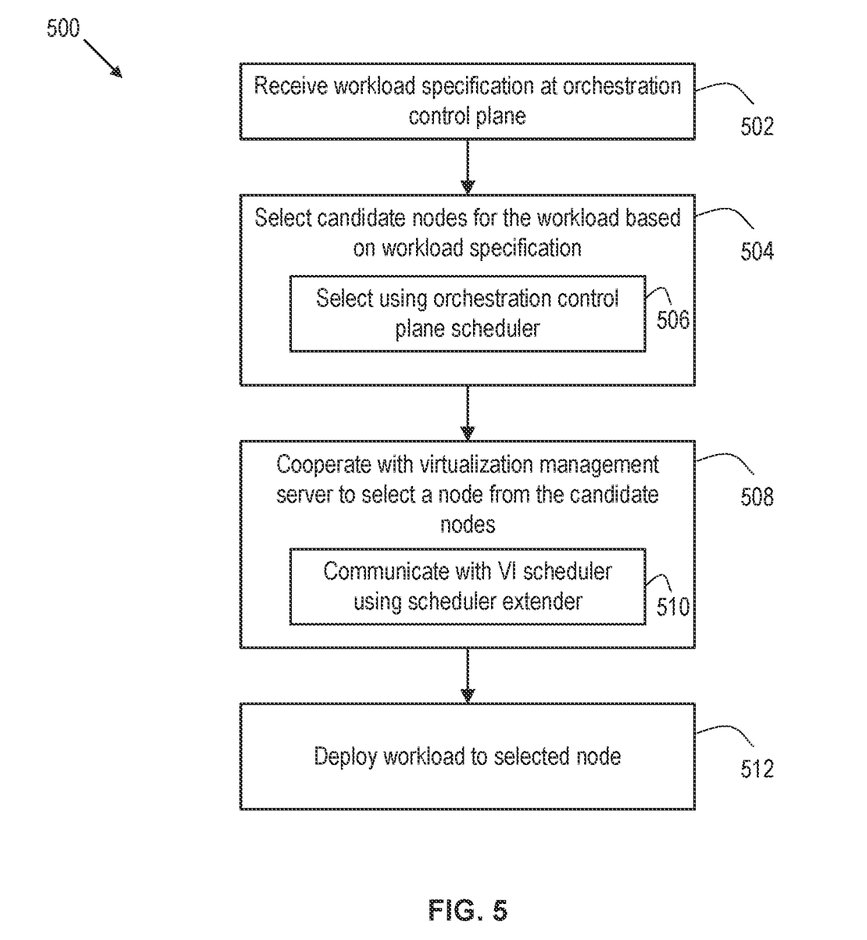
FIG. 5 is a flow diagram depicting a method of deploying a workload in a virtualized computing system according to an embodiment.

FIG. 5 is a flow diagram depicting a method 500 of deploying a workload in a virtualized computing system according to an embodiment. Method 500 can be performed by VI control plane 113 and orchestration control plane 115, which comprise software executing on CPU, memory, storage, and network resources managed by a virtualization layer (e.g., a hypervisor) and/or host operating system.

Method 500 begins at step 502, where orchestration control plane 115 receives a workload specification from a user. A workload specification defines properties of the workload, including the resources for the workload, resource constraints for the workload (e.g., resource quotas and limits for CPU, memory, storage, network), and the like. At step 504, orchestration control plane 115 select candidate nodes for the workload based on the workload specification. That is, orchestration control plane 115 filters all nodes to a set of candidate nodes. In embodiments, the nodes are hacked by hosts of host cluster 118. Orchestration control plane 115 includes a scheduler (e.g., scheduler 304) that selects the candidate set of nodes for the workload (step 506). Each node in the candidate set of nodes is capable of supporting the workload as defined in the workload specification. However, the orchestration control plane scheduler does not select a specific node for the workload. In this manner, the orchestration control plane scheduler is a slave scheduler.

At step 508, orchestration control plane 115 cooperates with VI control plane 113 to select a node from the candidate set of nodes. In embodiments, VI control plane 113 includes a scheduler (e.g., VI scheduler 117) that selects the node from the candidate set of nodes (step 510). In this manner, the VI control plane scheduler is a master scheduler that selects the node on behalf of the slave scheduler. In embodiments, orchestration control plane 115 includes a software component that interfaces with the VI control plane scheduler (e.g., a scheduler extender 306). Scheduler extender 306 provides the workload specification to VI scheduler 117 so that VI scheduler 117 can determine the resource requirements for the workload. VI scheduler 117 then selects a host 120 meeting the requirements and indicates to scheduler extender 306 the node corresponding to the selected host 120. At step 512, orchestration control plane 115 cooperates with VI control plane 113 to deploy the workload to the selected node.

Figure 6:
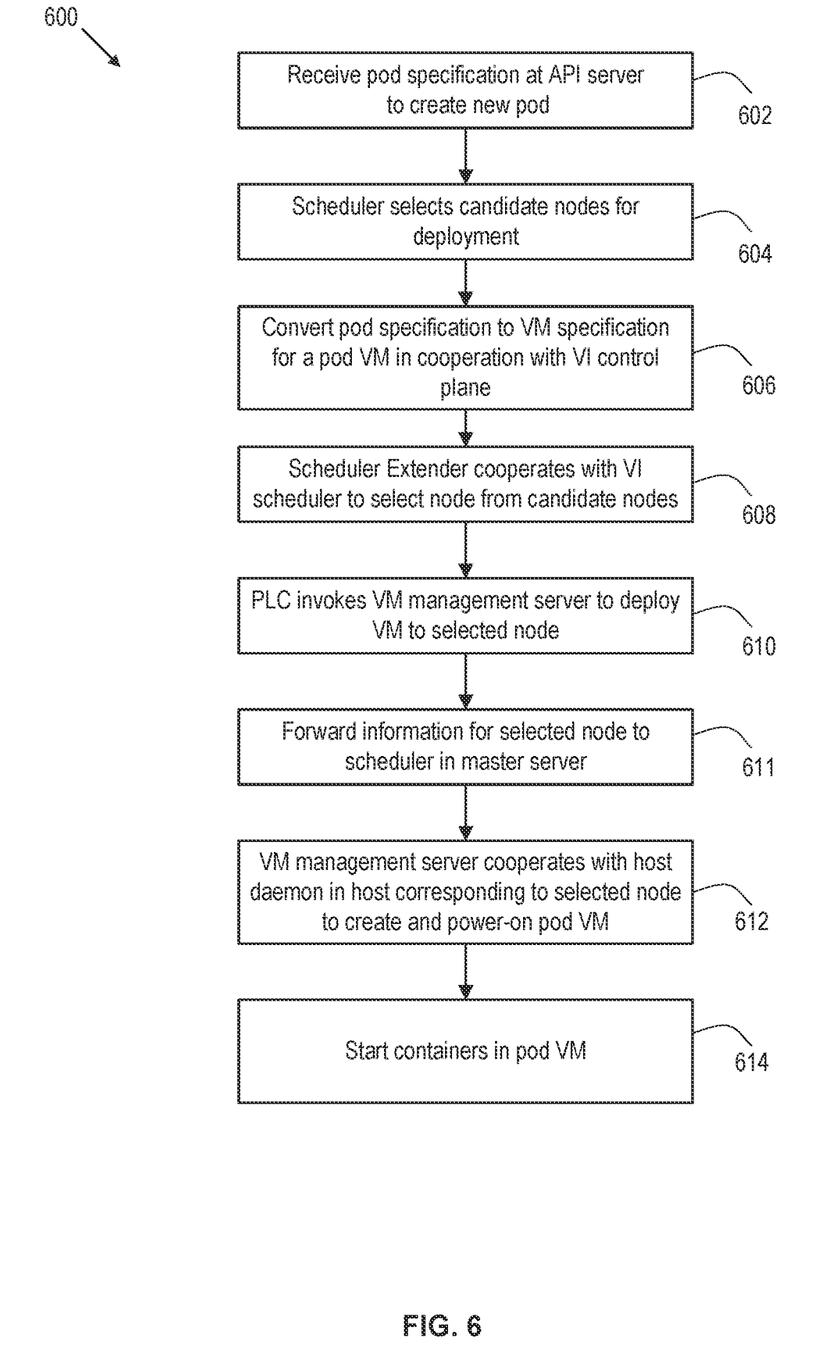
FIG. 6 is a flow diagram depicting operations of supervisor Kubernetes master and VM management server when deploying a pod according to an embodiment.

FIG. 6 is a flow diagram depicting operations of supervisor Kubernetes master 104 and VM management server 116 when deploying, a pod according to an embodiment. As shown in FIG. 6, a method 600 can be performed by VI control plane 113 and orchestration control plane 115, which comprise software executing on CPU, memory, storage, and network resources managed by a virtualization layer (e.g., a hypervisor) and/or host operating system. FIG. 6 shows an embodiment of method 500 for when the workload is a pod to be deployed on a pod VM.

Method 600 begins at step 602, where a user provides a pod specification to API server 302 to create a new pod. At step 604, scheduler 304 selects candidate nodes for deployment of the pod. That is, scheduler 304 filters all nodes to select the set of candidate nodes for deployment of the pod. Scheduler 304 selects the candidate nodes by filtering on affinity, node selector constraints, etc.

At step 606, scheduler 304 converts the pod specification to a VM specification for a pod VM 130. For example, scheduler 304 converts CPU and memory requests and limits from pod specification to VM specification with fallback to reasonable defaults. The VM specification includes a vNIC device attached to the logical network used by pod VMs 130. The guest OS in VM specification is specified to be kernel 210 with container engine 208. Storage is an ephemeral virtual disk. Scheduler 304 can cooperate with VI control plane 113 to obtain policies/configurations set by a VI admin at virtualization management server 116.

At step 608, scheduler extender 306 cooperates with VI scheduler 117 in VM management server 116 to select a node from the set of candidate nodes. VI scheduler 117 selects zero or one node from the list of a plurality of candidate nodes provided by scheduler extender 306.

At step 610, PLC 324 invokes VM management server 116 to deploy pod VM 130 to a host 120 corresponding to the selected node. At step 611, VI scheduler 117 can forward information about the selected node back to scheduler 304 in master server 104. At step 612, VM management server 116 cooperates with host daemon 214 in host 120 corresponding to the selected node to create and power-on pod VM 130. At step 614, pod VM agent 212 starts containers 206 in pod VM 130.

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of scheduling a workload in a virtualized computing system including a host cluster having a virtualization layer directly executing on hardware platforms of hosts, the virtualization layer supporting execution of virtual machines (VMs), the virtualization layer integrated with an orchestration control plane, the method comprising:
    receiving, at the orchestration control plane, a workload specification for the workload;
    selecting, by a first scheduler of the orchestration control plane, a plurality of nodes as candidates for the workload based on the workload specification, each of the plurality of nodes implemented by a host of the hosts;
    sending, by the first scheduler through a scheduler extender of the orchestration control plane, the plurality of nodes as candidate nodes to a second scheduler of a virtualization management server managing the host cluster;
    selecting, by the second scheduler, a node of the plurality of nodes, the first scheduler being a slave the second scheduler, which is a master, the master receiving the candidates from the slave and selecting the node from the candidates on behalf of the slave;
    receiving, at the first scheduler through the scheduler extender, the selected node from the second scheduler; and
    deploying, by the orchestration control plane in cooperation with the virtualization management server, the workload on a host in the host cluster implementing the selected node, the orchestration control plane deploying the workload through communication with a controller of a hypervisor of the host, the controller managing a VM having an agent executing therein, the controller executing the workload in the VM through communication with the agent.

2. The method of claim 1, wherein the VMs include pod VMs, the pod VMs including container engines supporting execution of containers in the pod VMs, wherein the workload is a pod and the workload specification is a pod specification, and wherein the pod specification is received at a master server of the orchestration control plane.

3. The method of claim 2, wherein the pod specification includes first resource constraints for a node, and wherein the master server selects the plurality of nodes as candidate nodes based on the first resource constraints in the pod specification.

4. The method of claim 3, wherein the virtualization management server converts the first resource constraints into second resource constraints for a host when selecting the node of the plurality of nodes.

5. The method of claim 4, wherein the first resource constraints and the second resource constraints include constraints on at least one of processor, memory, network, and storage.

6. The method of claim 3, further comprising:
    converting, by the orchestration control plane, the pod specification to a VM specification for a pod VM.

7. A non-transitory computer readable medium comprising instructions to be executed in a computing device to cause the computing device to carry out a method of scheduling a workload in a virtualized computing system including a host cluster having a virtualization layer directly executing on hardware platforms of hosts, the virtualization layer supporting execution of virtual machines (VMs), the virtualization layer integrated with an orchestration control plane, the method comprising:
    receiving, at the orchestration control plane, a workload specification for the workload;
    selecting, by a first scheduler of the orchestration control plane, a plurality of nodes as candidates for the workload based on the workload specification, each of the plurality of nodes implemented by a host of the hosts;
    sending, by the first scheduler through a scheduler extender of the orchestration control plane, the plurality of nodes as candidate nodes to a second scheduler of a virtualization management server managing the host cluster;
    selecting, by the second scheduler, a node of the plurality of nodes, the first scheduler being a slave the second scheduler, which is a master, the master receiving the candidates from the slave and selecting the node from the candidates on behalf of the slave;
    receiving, at the first scheduler through the scheduler extender, the selected node from the second scheduler; and
    deploying, by the orchestration control plane in cooperation with the virtualization management server, the workload on a host in the host cluster implementing the selected node, the orchestration control plane deploying the workload through communication with a controller of a hypervisor of the host, the controller managing a VM having an agent executing therein, the controller executing the workload in the VM through communication with the agent.

8. The non-transitory computer readable medium of claim 7, wherein the VMs include pod VMs, the pod VMs including container engines supporting execution of containers in the pod VMs, wherein the workload is a pod and the workload specification is a pod specification, and wherein the pod specification is received at a master server of the orchestration control plane.

9. The non-transitory computer readable medium of claim 8, wherein the pod specification includes first resource constraints for a node, and wherein the master server selects the plurality of nodes as candidate nodes based on the first resource constraints in the pod specification.

10. The non-transitory computer readable medium of claim 9, wherein the virtualization management server converts the first resource constraints into second resource constraints for a host when selecting the node of the plurality of nodes.

11. The non-transitory computer readable medium of claim 10, wherein the first resource constraints and the second resource constraints include constraints on at least one of processor, memory, network, and storage.

12. The non-transitory computer readable medium of claim 9, further comprising:
converting, by the orchestration control plane, the pod specification to a VM specification for a pod VM.

13. A virtualized computing system, comprising:
a host cluster, a virtualization management server, and an orchestration control plane;
the host cluster including a virtualization layer directly executing on hardware platforms of hosts, the virtualization layer supporting execution of virtual machines (VMs), the virtualization layer integrated with the orchestration control plane;
the orchestration control plane configured to:
receive a workload specification for a workload;
select, by a first scheduler of the orchestration control plane, a plurality of nodes as candidates for the workload based on the workload specification, each of the plurality of nodes implemented by a host of the hosts;
send, by the first scheduler through a scheduler extender of the orchestration control plane, the plurality of nodes as candidate nodes to a second scheduler of a virtualization management server managing the host cluster;
select, by the second scheduler, a node of the plurality of nodes, the first scheduler being a slave the second scheduler, which is a master, the master receiving the candidates from the slave and selecting the node from the candidates on behalf of the slave;
receive, at the first scheduler through the scheduler extender, the selected node from the second scheduler; and
deploy, in cooperation with the virtualization management server, the workload on a host in the host cluster implementing the selected node, the orchestration control plane configured to deploy the workload through communication with a controller of a hypervisor of the host, the controller configured to manage a VM having an agent executing therein, the controller configured to execute the workload in the VM through communication with the agent.

14. The virtualized computing system of claim 13, wherein the VMs include pod VMs, the pod VMs including container engines supporting execution of containers in the pod VMs, wherein the workload is a pod and the workload specification is a pod specification, and wherein the pod specification is received at a master server of the orchestration control plane.

15. The virtualized computing system of claim 14, wherein the pod specification includes first resource constraints for a node, and wherein the master server selects the plurality of nodes as candidate nodes based on the first resource constraints in the pod specification.

16. The virtualized computing system of claim 15, wherein the virtualization management server converts the first resource constraints into second resource constraints for a host when selecting the node of the plurality of nodes.

17. The virtualized computing system of claim 16, wherein the first resource constraints and the second resource constraints include constraints on at least one of processor, memory, network, and storage.

* * * * *